Sept. 14, 1965  W. T. BLAKE  3,206,024
SIZING AND GRADING MACHINE
Filed April 18, 1962  7 Sheets-Sheet 1

INVENTOR.
WILLIAM T. BLAKE
BY
HIS ATTORNEYS.

Sept. 14, 1965     W. T. BLAKE     3,206,024
SIZING AND GRADING MACHINE
Filed April 18, 1962     7 Sheets-Sheet 2
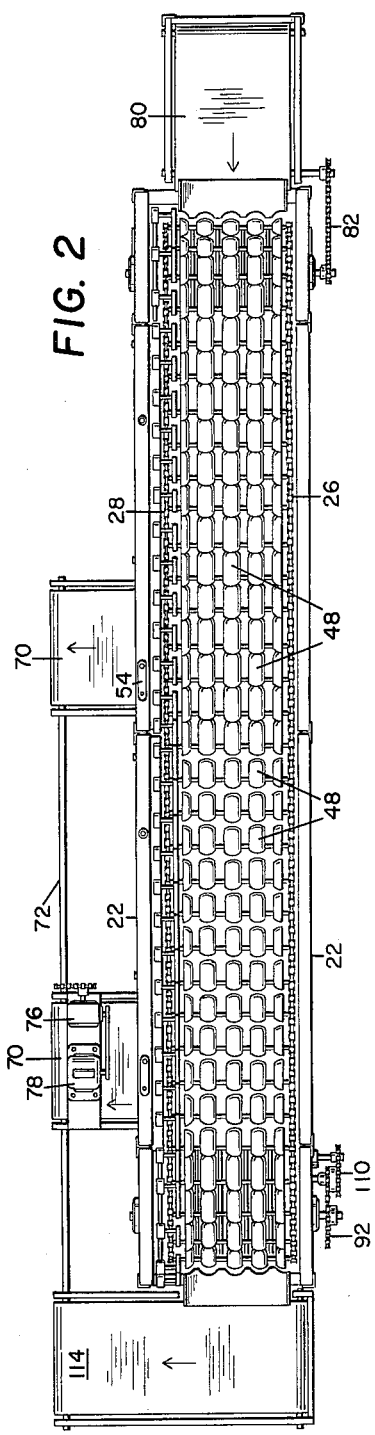
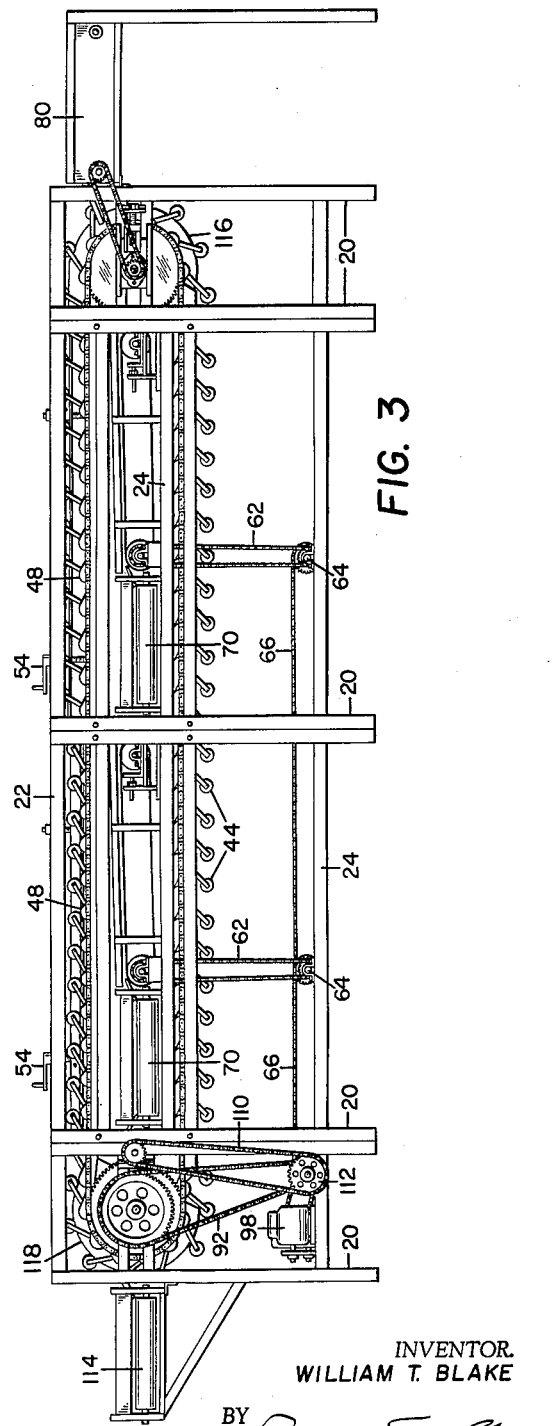
INVENTOR.
WILLIAM T. BLAKE
BY
HIS ATTORNEYS.

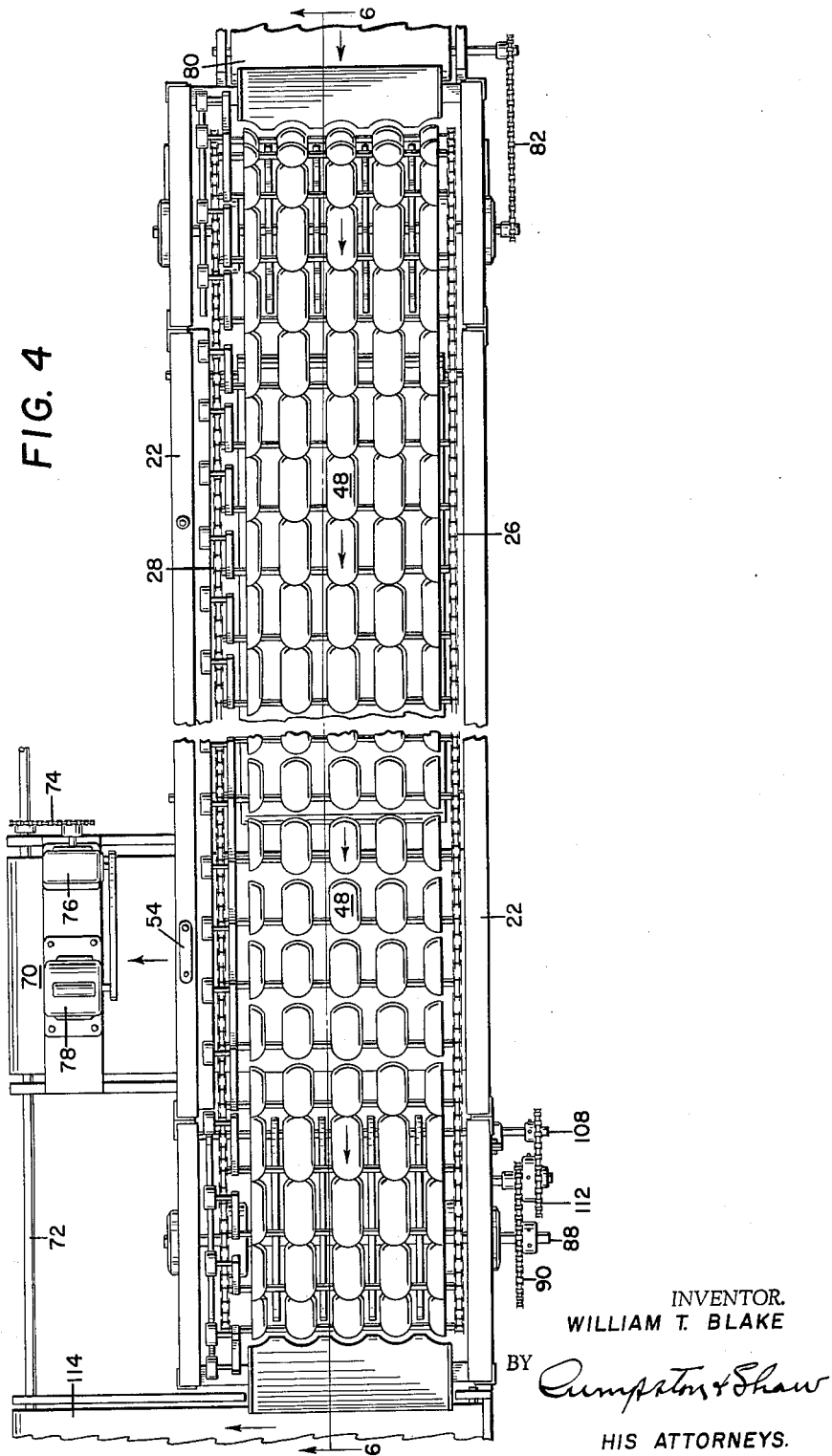

Sept. 14, 1965 W. T. BLAKE 3,206,024
SIZING AND GRADING MACHINE
Filed April 18, 1962 7 Sheets-Sheet 4

INVENTOR.
WILLIAM T. BLAKE
BY
HIS ATTORNEYS.

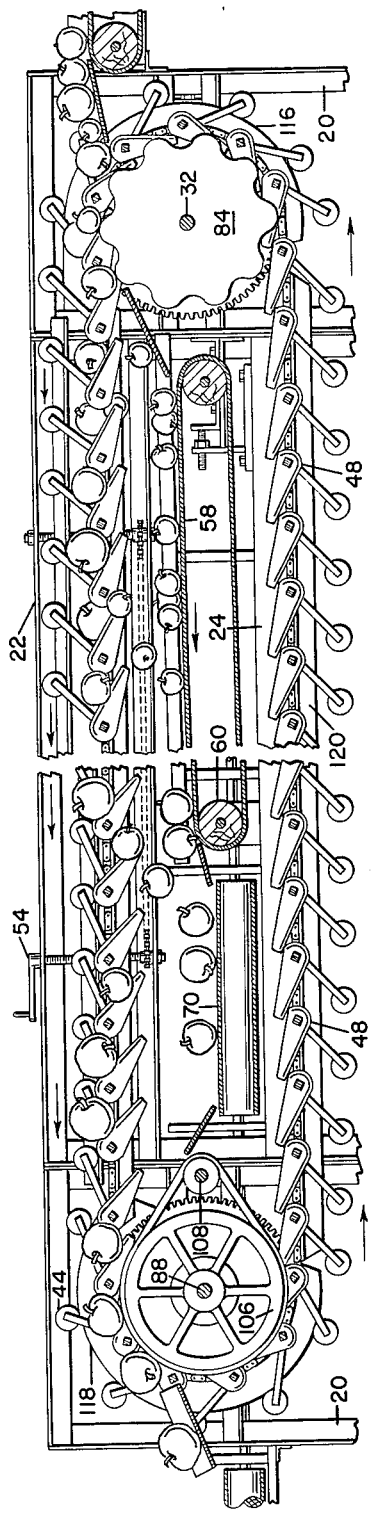
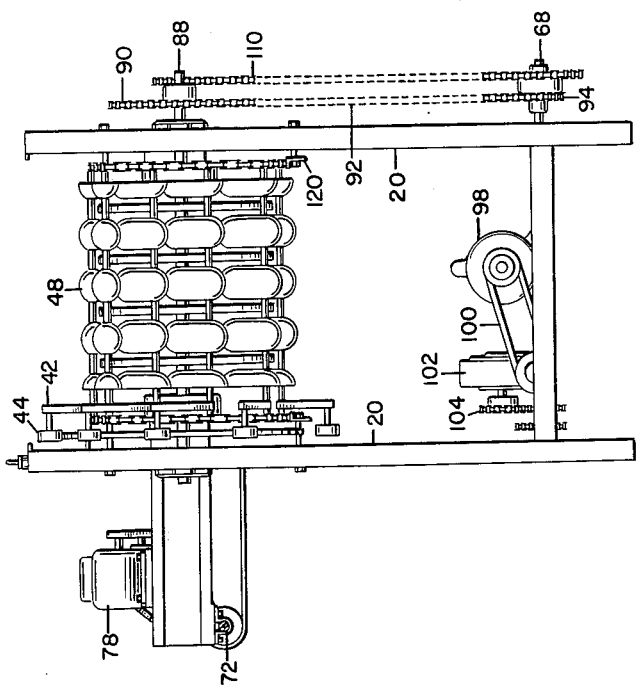

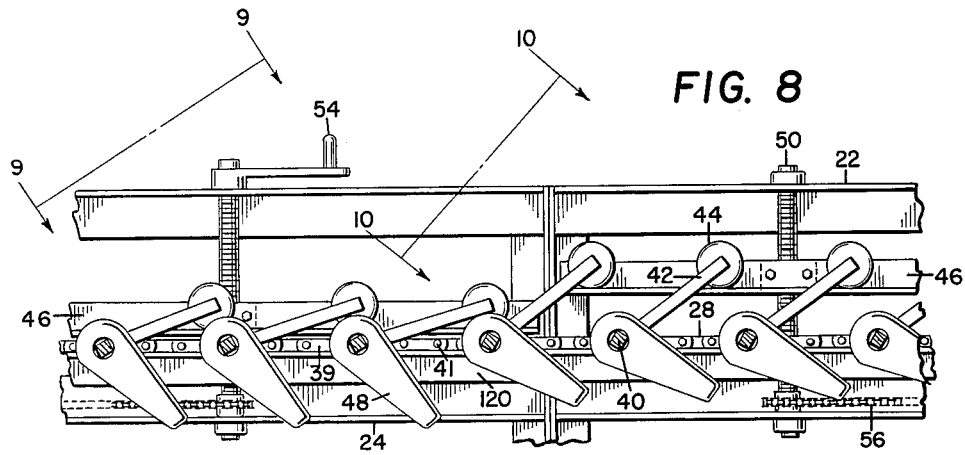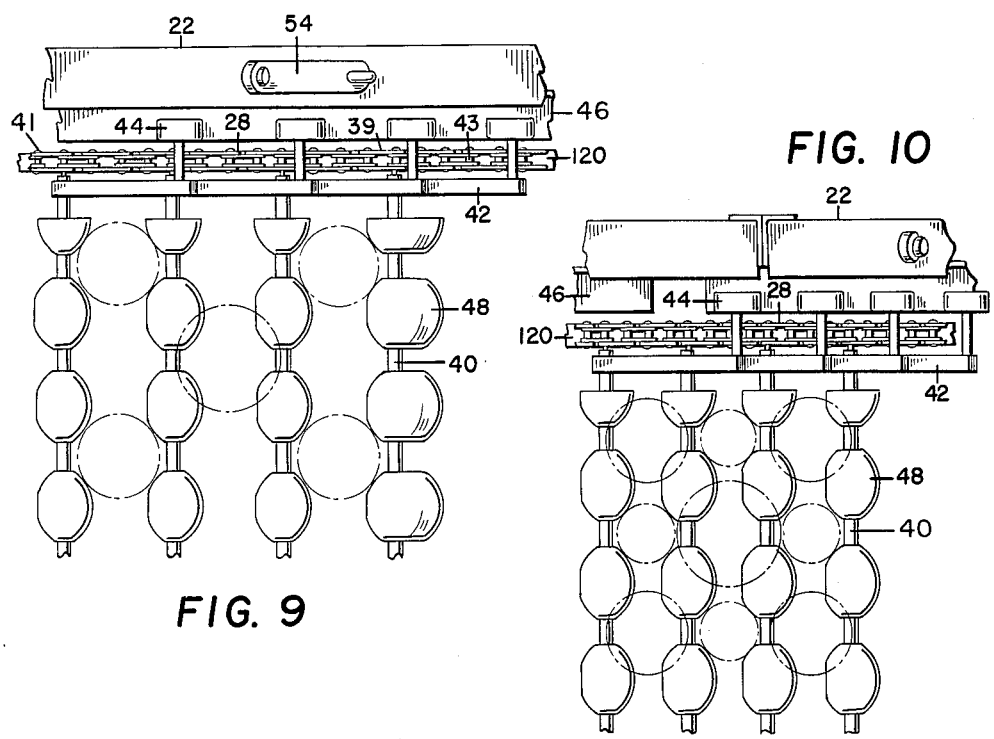

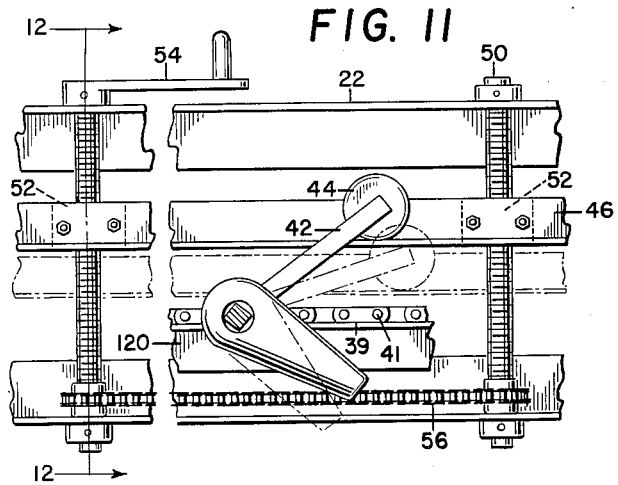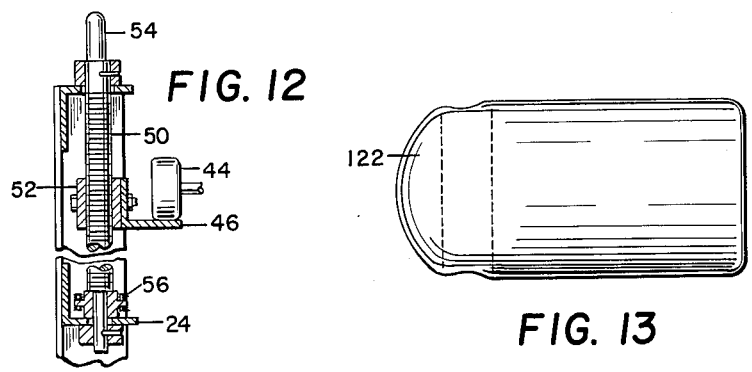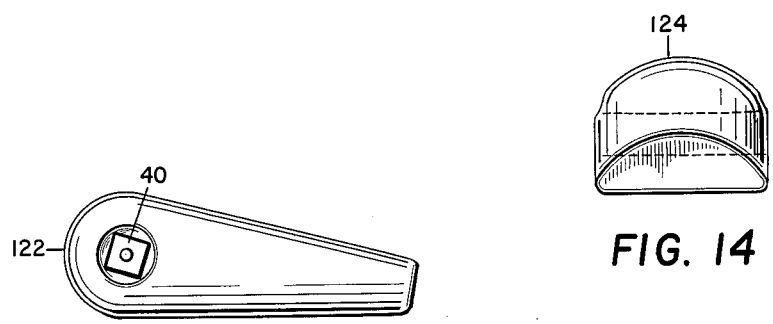

3,206,024
SIZING AND GRADING MACHINE
William T. Blake, Canandaigua, N.Y., assignor to Tew Manufacturing Corporation, Fairport, N.Y., a corporation of New York
Filed Apr. 18, 1962, Ser. No. 188,401
14 Claims. (Cl. 209—84)

This invention relates to machines for separating and grading articles according to size, such as apples or other fruits or agricultural products, one object being to provide an improved machine of this character having a more simple construction and increased rate of production.

Another object is to provide such a machine in which the products are sized and separated with minimum tendency to injury.

A further object is a machine in which the products are conveniently displayed for inspection and culling while being separated.

Still a further object is the provision of a machine having the above advantages in a construction which is more economical to manufacture and assemble and convenient to operate.

To these and other ends the invention resides in certain improvements and combinations of parts, all as will be hereinafter more fully described, the novel features being pointed out in the claims at the end of the specification.

In the drawings:

FIG. 2 is a top plan view;

FIG. 3 is a side elevation;

FIG. 4 is an enlarged top plan view partly broken away;

FIG. 6 is an enlarged sectional elevation on the line 6—6 in FIG. 4;

FIG. 7 is an end elevation as viewed from the left in FIG. 5;

FIG. 8 is an enlarged fragmentary elevation of parts shown in FIG. 6;

FIG. 9 is a perspective view of the separating fingers and associated parts as seen from the line 9—9 in FIG. 8;

FIG. 10 is a similar view from the line 10—10 in FIG. 8;

FIG. 11 is a fragmentary view similar to FIG. 8 to further illustrate the construction and operation of the track adjusting means;

FIG. 12 is a section on the line 12—12 in FIG. 11;

FIG. 13 is an enlarged top view of a separating finger;

FIG. 14 is an end elevation as viewed from the right in FIG. 13, and

FIG. 15 is a side elevation as viewed from the left in FIG. 14.

The invention is embodied in a machine comprising an elongated frame having an endless carrier chain extending longitudinally along each side of the frame, with a cross shaft at each end of the frame carrying sprockets for driving the chains. The chains are connected across the frame by longitudinally spaced rod elements having their ends rockably mounted in the chains, respectively, and each having fixed thereon a plurality of spaced fingers with the fingers of each rod overlapping the fingers of adjacent rods, in longitudinal rows, to provide gaps or spaces between the rows and fingers, for passing the apples or other articles downwardly to a system of belts for delivering the same laterally of the frame. The fingers are shaped to provide 4-point contact with each apple passing therebetween and each rod has fixed thereon an arm carrying a roller running along a succession of track sections arranged at different elevations for varying the separation of the fingers and the size of the apples passing therebetween to the delivery belts. In the present instance, a machine such as described above preferably comprises a main frame having a plurality of supporting standards or posts 20 connected by laterally extending cross rails, as 21, and longitudinally extending top rails 22 and side rails 24.

Figure 5:
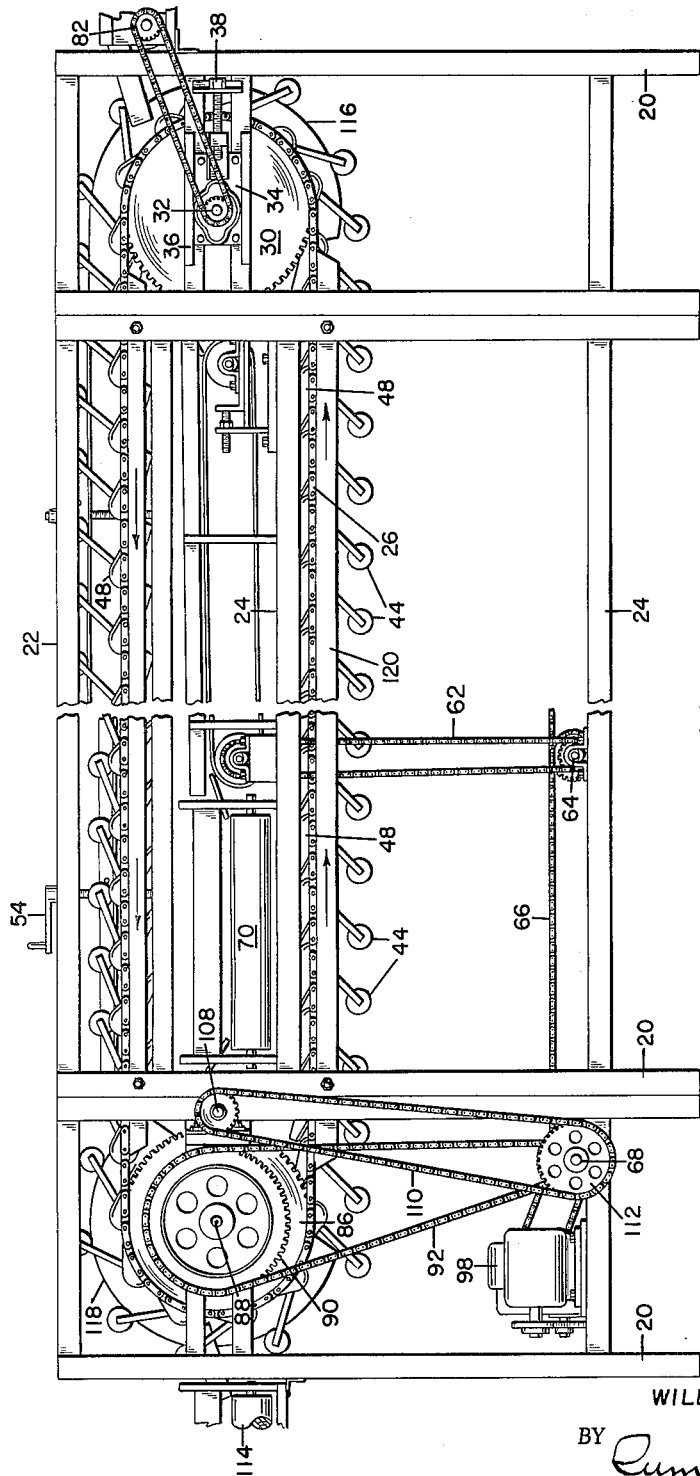
FIG. 5 is an enlarged side elevation partly broken away.

A pair of carrier sprocket chains, 26 and 28 (FIGS. 2, 4 and 5), are positioned to extend longitudinally, one at each side of the frame, and engage driving sprockets at the frame ends. At the input or right hand end of the machine (FIG. 5) the chains are engaged around a pair of sprockets 30, respectively, fixed on the ends of a shaft 32 having its ends journalled in bearings 34 slidably supported between rails 36 carried by the ends of the side rails of the frame. Bearings 34 are adjustable to properly tension the carrier chains, by bolts 38 carried by the frame and threadedly connected with the bearings, as shown. The carrier chains are further supported and driven by similar sprockets on a cross shaft at the delivery end of the machine, as hereafter more fully described.

Each carrier chain is of the known construction comprising side links 39 (FIG. 11) pivoted together in pairs by spindles 41, as shown (FIGS. 8 and 9), with rollers 43 on the spindles between the side links. The carrier chains 26 and 28 are connected at uniform distances by spaced parallel elements, bars or rods 40 having their ends serving as spindles in the chains and thus rockably supported by the chains. Each rod 40 has fixed thereon an arm 42 carrying at its outer end a roller 44 positioned to roll along a sectional rail flange cam track 46 adjustably supported on the frame. Each rod has fixed thereon a plurality of spaced fingers 48 (FIGS. 8 and 9) each mounted at one end on a rod and trailing therefrom, in alignment with one another on adjacent rods, as shown. Each finger is preferably formed with generally rounded leading ends and upper surfaces (FIGS. 13–15) to provide 4-point contact with apples contacting adjacent fingers on adjacent elements.

The plurality of finger positioning tracks, as 46, of which any desired number may be employed (by lengthening the machine) are positioned in aligned succession at progressively decreasing elevations above the carrier chains, as shown, to vary the relative positions or spaces between the fingers for passing apples of different sizes. Each track section is supported adjacent each end by a threaded spindle 50 (FIGS. 11 and 12) engaging a nut 52 fixed on the track. The opposite ends of the spindles carry nuts for rotatably supporting them on the top rail 22 and a lower side rail 24 of the frame. One spindle of each track carries a crank handle 54 for rotating it and the spindles of each track carry sprockets and a connecting chain 56 to produce uniform rotation of the spindles to uniformly raise or lower the ends of the track.

Each track has positioned thereunder a receiving belt, as 58 (FIG. 6) extending longitudinally of the track and supported at its ends on rollers 60. The roller trunnions are mounted in bearings on the side rails and carry sprockets connected by chains 62 (FIG. 5) with sprockets on spindles 64 rotatably mounted on a lower side rail 24. Spindles 64 carry sprockets driven by a chain 66 extending longitudinally of the frame from sprockets on the main driven shaft 68 on the frame as hereafter described.

Figure 1:
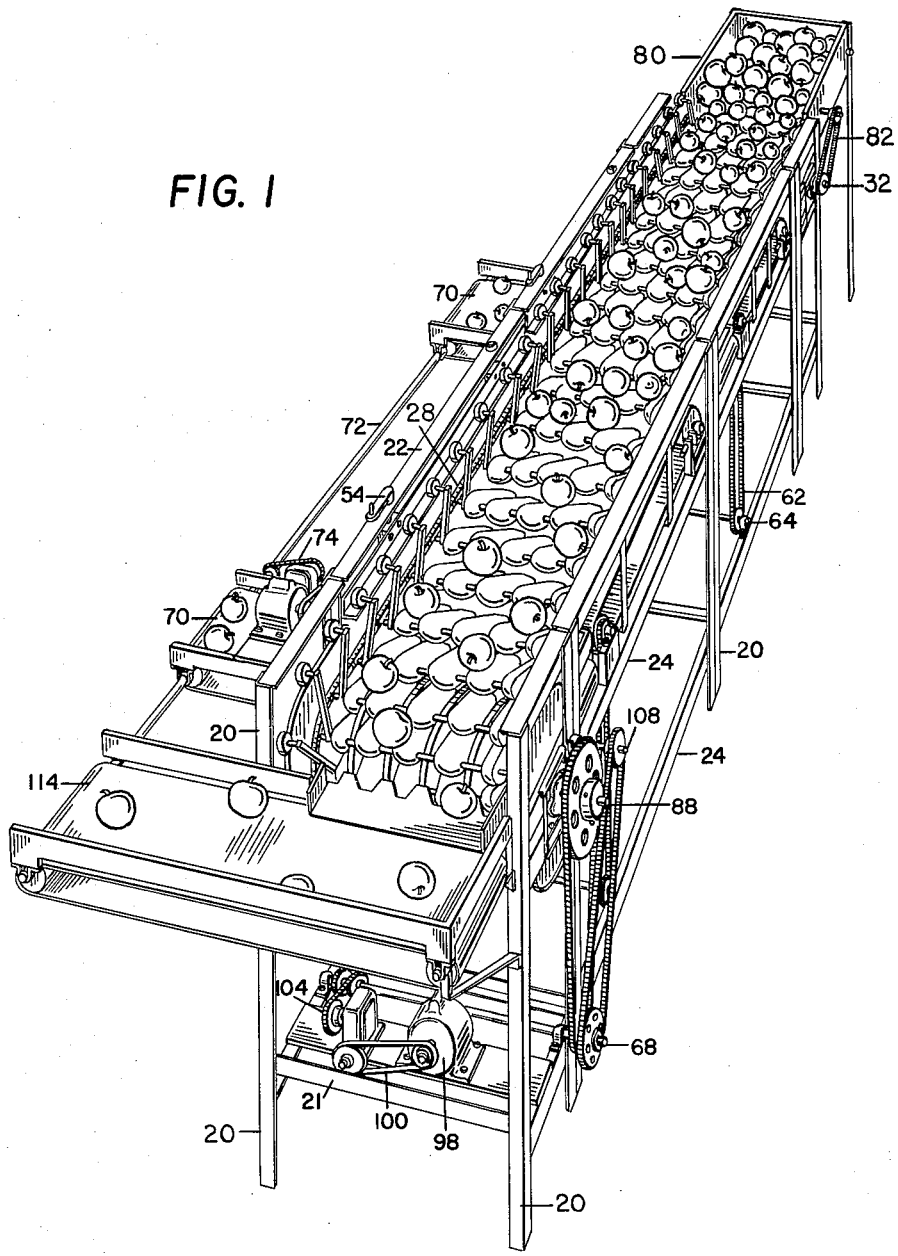
FIG. 1 is a perspective view of a machine embodying the present invention in course of operation.

Each longitudinal belt 58 delivers fruit of a given size falling thereon to a short transverse belt 70 carried by pulleys on the frame, and the outer pulley of each transverse belt is mounted on a shaft 72 extending longitudinally at one side of the frame (FIG. 1). This shaft is driven by a sprocket and chain connection 74 (FIG. 4)

with a speed reducing gearing 76 connected to and driven by an electric motor 78 mounted on brackets at one side of the frame.

A hopper belt 80 at the input end of the machine is driven by sprocket and chain connections 82 (FIGS. 2 and 5) with one end of the shaft 32 of the carrier chains.

Sprocket shaft 32 at the input end of the machine has fixed thereon a plurality of discs 84 (FIG. 6) each located between adjacent rows of fingers on the carrier chains and just below the fingers for supporting small fruit against falling between the rows of fingers, thus insuring delivery of such fruit with the fruit of smallest size separated at the input end of the machine.

The carrier chains 26 and 28 are supported at their opposite ends and driven by sprockets 86 fixed on a shaft 88 journalled at its ends in bearings on the side rails at the delivery end of the frame. Shaft 88 has fixed thereon a sprocket 90 driven by a chain 92 passing around a sprocket 94 (FIG. 7) on a shaft 68 rotating in bearings on a lower side rail 24 of the frame. An electric motor 98 on the frame has a driving connection 100 with a change speed gearing 102 having a driving connection 104 with shaft 68 (FIGS. 1 and 7). Shaft 68 is thus the main driving shaft for the chain carriers and the input belt 80.

Shaft 88 has rotatably mounted thereon a plurality of circular members or discs 106 (FIG. 6) each between adjacent rows of fingers 48, and of sufficient diameter to engage and lift fruit remaining between the fingers at the delivery end of the machine. These circular members 106 preferably have grooved peripheries for V-belts driven by small pulleys on a shaft 108 having a sprocket connected by a chain 110 with a sprocket 112 on the main driven shaft 68. This driving connection for the discs 106 has a speed ratio adapted to drive the discs at a greater speed than the carrier chains and fingers and to lift and discharge the fruit from the fingers to a final delivery belt 114 having its outer pulley driven by shaft 72. This provision insures the separation and delivery of the fruit from the fingers without pressure from the fingers which might injure the fruit.

The frame is provided at the input end of the machine with a semi-circular guide track 116 (FIGS. 3 and 5) in position for engagement by the rollers 44 of the fingers so as to maintain the rollers raised and the spaces closed between the fingers, to thereby prevent small fruit falling between the fingers and insure its delivery to the first longitudinal belt 58 and its side delivery belt 70. Similarly, at the delivery end of the machine, the frame is provided with a semi-circular disc 118 for closing the spaces between the fingers and preventing any material from falling into the mechanism.

A narrow track, such as an upturned plate edge 120 (FIGS. 6 and 7) is mounted on each side of the frame to engage the rollers of the carrier chains between the side links thereof, to support the reaches of the chains between their end sprockets and maintain them horizontal, with minimum frictional resistance to the movement of the chains.

The fingers 48 are shaped with generally rounded leading ends 122 (FIGS. 13–15) and generally rounded upper surfaces 124. The rounding of the leading ends guides and facilitates entry of the fruit between the fingers without injury and the rounding of the upper surfaces serves to widen the space between adjacent fingers as they are lowered and opened, thus maintaining the desired 4-point contact with an apple contacting adjacent fingers on adjacent elements or rods 40 for apples for varying diameters, as indicated in FIGS. 9 and 10.

While the discs 106 for lifting and discharging the apples are preferably driven by V-belts as described, such discs may have plain or flat peripheries if so desired and be driven by belted connection (not shown) between their hubs and the shaft 108.

It is apparent from the above description that the invention provides a machine of relatively simple construction in which the products are handled without tendency to injury and at a relatively high rate of operation. The number of different sizes into which the fruit is separated and graded may be increased by multiplying the number of sections through which the carrier chains travel. The adjustments of the tracks for controlling the different sizes of separation are quickly and conveniently accomplished by means of the crank handles 54. The fruits are conveniently exposed and displayed for inspection and culling while travelling along on the separating fingers at the top of the machine and these and other advantages are provided in a construction which is economical to manufacture and operate.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention or the scope of the appended claims.

I claim:

1. A machine for sizing and grading agricultural products comprising an elongated supporting frame, a continuous carrier chain extending longitudinally on each side of said frame, means for synchronously driving said chains, a plurality of spaced parallel transversely extending elements connecting said chains and each having its ends rockably supported therein respectively, a plurality of spaced fingers mounted at one end on each of said elements and trailing therefrom in alignment with one another on adjacent elements, said fingers having rounded leading ends and upper surfaces to provide four-point contact with products contacting adjacent fingers on adjacent elements, and means for successively rocking said elements at spaced points in the travel of said driven chains to progressively vary the spaces between said adjacent fingers and discharge and separate said products according to size.

2. A machine having the construction specified in claim 1 comprising conveying means extending transversely of said chains at said spaced points for receiving said products discharged from said fingers and separately delivering said products laterally of the direction of travel of said chains, and means for driving said conveying means.

3. A machine having the construction specified in claim 1 comprising a rotary shaft at each end of said frame provided with sprocket wheels for said chains, products receiving means at one end of said frame for feeding said products to said chain fingers and discs fixed on said shaft adjacent said receiving means between said fingers thereon to support small products while being fed to said fingers.

4. A machine having the construction specified in claim 1 in which said fingers have a tapered shape decreasing in thickness from their leading to their trailing ends.

5. A machine having the construction specified in claim 1 comprising a rotary shaft at each end of said frame provided with sprocket wheels for said chains, substantially circular members rotatably mounted on said shaft at the delivery end of said chains and projecting between adjacent rows of said fingers and means for driving said members faster than said fingers to rotate and free said products from said fingers and discharge the same therefrom.

6. A machine having the construction specified in claim 5 in which said circular members are V-belt pulleys carrying V-belts and provided with means for driving the same faster than said fingers.

7. A machine having the construction specified in claim 3 in which said chains have rollers between adjacent pairs of spaced side links and said frame is provided with tracks engaging and supporting said rollers between said links and supporting said chains between said sprocket wheels.

8. A machine for sizing and grading agricultural products comprising an elongated supporting frame, a continuous carrier chain on each side of said frame, means for synchronously driving said chains, a plurality of spaced parallel transversely extending elements connecting said chains and each having its ends rockably supported therein respectively, a plurality of spaced fingers mounted at one end on each of said elements and trailing therefrom in alignment with one another on adjacent elements, said fingers having rounded leading ends and upper surfaces to provide four-point contact with products contacting adjacent fingers on adjacent elements, said frame having a plurality of separate tracks sections thereon extending substantially parallel with said chains and at progressively different distances from said chains and arms on said elements having rollers engaging said tracks and positioned thereby to progressively rock said elements and vary the spaces between said fingers.

9. A machine having the construction specified in claim 8 in which the ends of each of said tracks are positioned by spindles threadedly connected and supported by said frame with chain and sprocket connections between the spindles of each track and means are provided for simultaneously rotating said spindles to uniformly adjust the ends of each track to adjust the sizing separation of said fingers.

10. A machine having the construction specified in claim 8 comprising a belt extending longitudinally under each of said tracks and a belt extending transversely of said tracks to which the products are delivered by said longitudinal belt for discharge from said machine and means for driving said belts.

11. A machine having the construction specified in claim 8 comprising substantially circular guides at the ends of said tracks for engagement by said rollers to maintain said fingers in position to close the spaces therebetween.

12. A machine for sizing and grading agricultural products comprising an elongated frame, sprocket wheels on opposite sides adjacent the ends of said frame, sprocket chains of constant length extending longitudinally on opposite sides of said frame and around said wheels, a plurality of longitudinally spaced bars each extending transversely of said frame with its end journaled in said chains, respectively, and having a plurality of spaced fingers trailing therefrom transversely thereof adjacent the fingers adjacent bars, each of said fingers having a tapered shape decreasing in thickness from its leading to its trailing end, a cam track having a plurality of sections extending longitudinally on said frame and separately adjustable thereon toward and from said bars, arms on said bars provided with means for engagement with said track sections to rotarily adjust said bars to position said fingers, of adjacent bars for cooperation with one another to form openings therebetween for transmitting articles of predetermined size, means for variably positioning said track sections to vary the size of transmitted articles, means for feeding said articles to said fingers adjacent one end of said frame and for separately delivering articles of different sizes transmitted by said fingers, and means for rotating said wheels and actuating said feeding and delivering means.

13. A machine for sizing and grading agricultural products comprising an elongated frame, sprocket wheels on opposite sides adjacent the ends of said frame, sprocket chains of constant length extending longitudinally on opposite sides of said frame and around said wheels, a plurality of longitudinally spaced bars each extending transversely of said frame with its ends journaled in said chains, respectively, and having a plurality of spaced fingers trailing therefrom transversely thereof adjacent the fingers on adjacent bars, each of said fingers being mounted at one end on one of said bars and trailing therefrom in alignment with fingers on adjacent bars; said fingers having rounded leading ends and upper surfaces to provide four-point contact with products contacting adjacent fingers on adjacent bars, said frame having thereon a plurality of separate cam track sections extending substantially parallel with said chains at progressively different distances therefrom and arms on said bars provided with means for engagement with said track to rotarily adjust said bars to position said fingers of adjacent bars for cooperation with one another to form openings therebetween for transmitting articles of predetermined size, means for feeding said articles to said fingers adjacent one end of said frame and for delivering articles transmitted by said fingers, and means for rotating said sprocket wheels.

14. A machine for sizing and grading agricultural products comprising an elongated frame, sprocket wheels on opposite sides adjacent the ends of said frame, sprocket chains of constant length extending longitudinally on opposite sides of said frame and around said wheels, a plurality of longitudinally spaced bars each extending transversely of said frame with its ends journaled in said chains, respectively, and having a plurality of spaced fingers trailing therefrom transversely thereof adjacent the fingers on adjacent bars, each of said fingers being mounted at one end on one of said bars and trailing therefrom in alignment with said fingers on adjacent bars, said fingers having rounded leading ends and upper surfaces to provide four-point contact with products contacting adjacent fingers on adjacent bars, said frame having thereon a plurality of separate cam track sections extending substantially parallel with said chains at progressively different distances therefrom, arms on said bars provided with means for engagement with said track section to rotarily adjust said bars to position said fingers of adjacent bars for cooperation with one another to form openings therebetween for transmitting articles of predetermined size, means for variably positioning said track sections to vary the size of transmitted articles, means for feeding said articles to said fingers adjacent one end of said frame and for separately delivering articles of different sizes transmitted by said fingers and means for rotating said wheels and actuating said feeding and delivering means.

References Cited by the Examiner

UNITED STATES PATENTS

| | | | |
|---|---|---|---|
| 1,097,439 | 5/14 | Jaquette | 209—84 |
| 2,244,729 | 6/41 | Sammis | 209—98 |
| 2,827,645 | 3/58 | Miller | 209—102 X |
| 2,860,779 | 11/58 | Lindeman | 209—84 |
| 2,917,170 | 12/59 | Flodin | 209—84 X |
| 3,038,605 | 6/62 | Durand | 209—97 |

ROBERT B. REEVES, *Acting Primary Examiner.*

SAMUEL F. COLEMAN, *Examiner.*